United States Patent [19]

Gounder et al.

[11] 4,340,715
[45] Jul. 20, 1982

[54] EPOXY RESIN COMPOSITIONS CURED WITH IMIDE-AMINES

[75] Inventors: Raj N. Gounder, Robbinsville, N.J.; John T. Geary, Erie, Pa.

[73] Assignee: Lord Corporation, Erie, Pa.

[21] Appl. No.: 267,149

[22] Filed: May 26, 1981

[51] Int. Cl.³ .............................................. C08G 59/54
[52] U.S. Cl. .................................... 528/99; 525/504; 528/96; 528/117; 528/322
[58] Field of Search .................. 528/96, 99, 117, 322; 525/504

[56] References Cited

U.S. PATENT DOCUMENTS

| | | | |
|---|---|---|---|
| 3,346,665 | 10/1967 | Schwarzer | 528/117 X |
| 4,113,737 | 9/1978 | Balme et al. | 260/326.26 |
| 4,273,916 | 6/1981 | Jones | 528/117 |

*Primary Examiner*—Earl A. Nielsen
*Attorney, Agent, or Firm*—John A. Gazewood

[57] ABSTRACT

Imide-amines having the structure

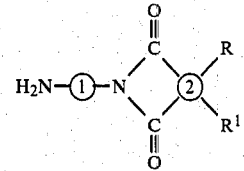

wherein

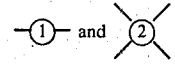

are certain cycloaliphatic or aromatic groups and R and R individually are hydrogen, halogen, an alkyl group having from 1 to 4 carbon atoms, hydroxy, carboxyl, and amine and when taken together represent

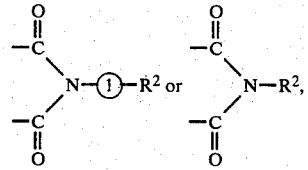

wherein $R^2$ is the same as R and $R^1$, have been found to provide cured epoxy resin systems characterized by high temperature stability and excellent mechanical and physical properties.

13 Claims, No Drawings

EPOXY RESIN COMPOSITIONS CURED WITH IMIDE-AMINES

BACKGROUND OF THE INVENTION

1. Field of the Invention

This invention relates to epoxy resin compositions. More particularly, the invention relates to epoxy resin compositions which are curable at ambient temperatures to afford products having useful properties at high temperatures.

2. Description of the Prior Art

Epoxy resins are among the most versatile of the plastic materials. Because of their toughness, adhesion, chemical resistance and electrical properties, the combination of which is not found in any other single organic polymeric material, the epoxy resins are widely used in coating, adhesives, casting, molding, laminating, potting and encapsulation, and reinforced plastic applications. In general, the epoxy resin is not used by itself but requires the addition of a curing agent or hardner to convert the resin to a crosslinked material. Curing agents which are commonly employed with epoxy resins include aliphatic and aromatic amines, polyamides, tertiary amines, amine adducts, acids, acid monoanhydrides, acid dianhydrides, aldehyde condensation products, and Lewis acid type catalysts. Selection of an appropriate curing agent depends upon system requirements such as mixture viscosity, system mass and temperature, and the characteristics desired in the cured resin such as resistance to temperature and chemicals, electrical properties, and the like.

In recent years, there has been an increasing demand from the aerospace industry and other industrial applications for materials having high-temperature utility. High-temperature utility can be improved through the use of anhydride and certain amine curing agents at elevated curing cycles, as well as through the use of epoxy resins obtained by the epoxidation, with peroxy compounds, of double bonds in certain Diels-Alder adducts. However, in many applications the high-temperature utility is insufficient. Studies indicate that temperature resistance, as well as chemical and heat resistance, is a function of crosslink density of the cured resin, with higher crosslink density affording improvements in these properties. Higher crosslink density can be achieved by increasing the functionality of either the epoxy resin or the hardening agent.

Polyimides based on all aromatic ring structures are known to impart improved high temperature resistance as well as increased chemical and solvent resistance, to cured epoxy resin compositions. Unfortunately, these aromatic polyimides suffer from the drawback that they are generally high melting solids which are not soluble to any appreciable extent in common solvents or epoxy resins and therefore are difficult to incorporate in epoxy resins except at elevated temperatures. In addition, epoxy resin compositions containing these aromatic polyimides as curing agents require high temperature curing cycles.

Thus, there is a continuing search for new epoxy resins and curing agents which can be cured at low temperatures to afford cured resin systems having good high temperature stability.

BRIEF SUMMARY OF THE INVENTION

In accordance with the present invention, it has been found that certain imide-amine curing agents can be readily incorporated into epoxy resins to afford epoxy compositions curable at room temperature to provide cured epoxy systems characterized by high temperature stability and excellent mechanical and physical properties. Because the epoxy resin compositions of the invention are curable at room temperature, the compositions of the invention are advantageously provided as a two-pack epoxy resin system comprising:

(a) a first pack comprising an imide-amine having the structure

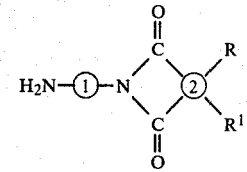

wherein —①— is a divalent cycloaliphatic or aromatic radical selected from the group consisting of

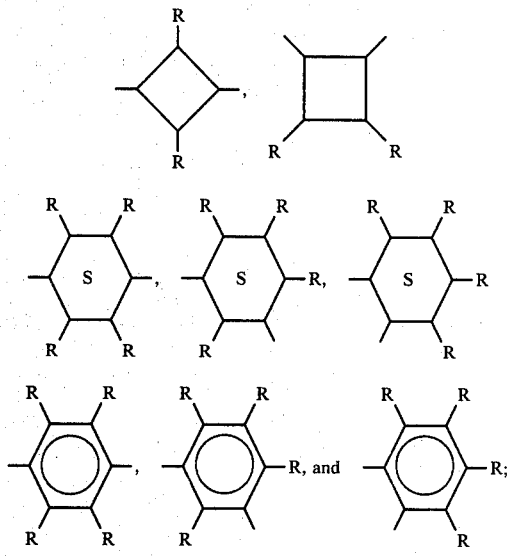

is a tetravelanet cycloaliphatic or aromatic radical selected from the group consisting of

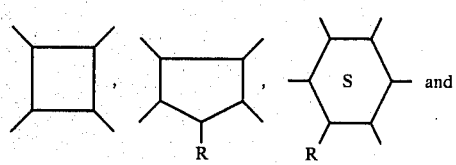

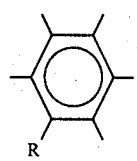

R and R¹ can be the same or different and each is selected from the group consisting of hydrogen, halogen, alkyl group having from 1 to 4 carbon atoms, hydroxyl, carboxyl and amine and when taken together, R and R¹ are

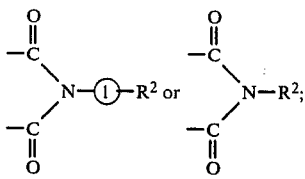

wherein R² is the same as R and R¹; with the proviso that, in all cases, either

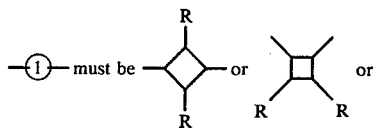

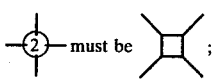

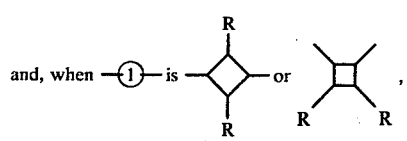

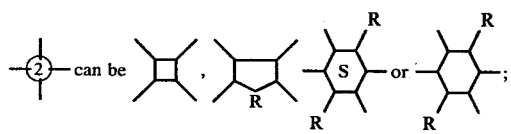

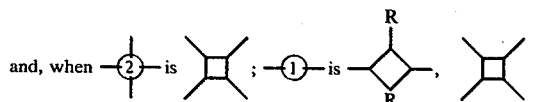

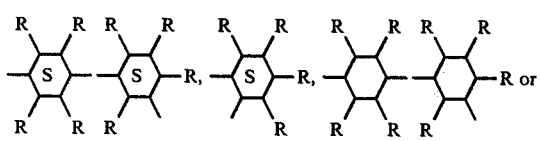

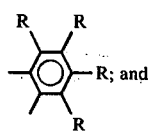

(b) a second pack comprising an epoxy resin substantially free of active hydrogen having a 1,2 epoxy equivalent value of greater than 1 and capable of solubilizing said imide-amine.

DETAILED DESCRIPTION OF THE INVENTION

The imide-amines which are employed in the practice of the present invention are normally solid compounds prepared by reacting a cycloaliphatic or aromatic diamine having the structure:

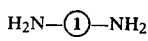

wherein —①— is as defined above, with a cycloaliphatic or aromatic tetracarboxylic acid dianhydride having the structure:

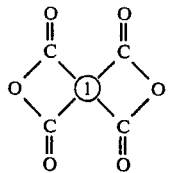

(hereinafter referred to as "dianhydride") wherein ① is as defined above or with a cycloaliphatic or aromatic monoanhydride having the structure:

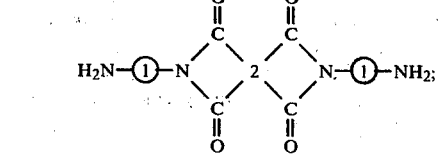

wherein

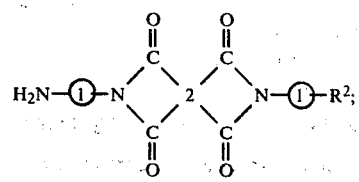

and R and R¹ are as defined above. The reaction of the anhydride and diamine to provide the imide-amine curing agents can be carried out by first adding a solution of the anhydride to a solution of the diamine to form the corresponding hydroxamic acid. This reaction to the hydroxamic acid proceeds readily at room temperature but elevated temperatures can be employed to hasten the reaction, if desired. The resulting hydroxamic acid is then condensed to the desired imide-amine by simply heating the hydroxamic acid to an elevated temperature, for instance, above 180° C. Alternatively, the conversion to the imide-amine can be effected at lower temperatures by the use of appropriate solvents, for example, a mixture of pyridine and acetic anhydride pursuant to condensation methods and techniques well known in the art.

The imide-amines of the invention fall into one of the following four classes of compounds:

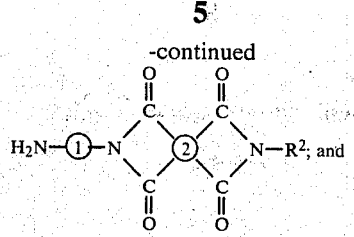

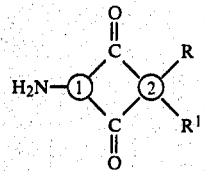

In each of the above cases I–IV,

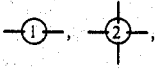

R, R¹ and R² are as defined above.

The imide-amine curing agents of Class I of the invention may be prepared by reacting two moles of the cycloaliphatic or aromatic H₂N—①—NH₂ per mole of dianhydride. Class II compounds wherein R² is other than NH₂ may be prepared by reacting one mole of the diamine H₂N—①—NH₂ with one mole of dianhydride and then with one mole of R²—①—NH₂ wherein R² and —①— are as defined above. Class III compounds may be prepared by reacting one mole of the diamine H₂N—①—NH₂ with one mole of dianhydride and then with one mole of R²NH₂ wherein R² is as defined above. Class IV compounds are RNH₂ wherein R is as defined above. Class IV compounds are prepared by reacting one mole of the diamine H₂N—①—NH₂ with one mole of the monoanhydride,

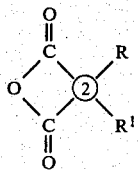

wherein

R and R¹ are as defined above.

Illustrative of suitable dianhydrides for use in the preparation of the imide-amine curing agents are cyclobutane tetracarboxylic dianhydride, benzene-1,2,4,5-tetracarboxylic dianhydride, cyclopentane-1,2,3,5-tetracarboxylic dianhydride, 3,6-dimethylbenzene-1,2,4,5-tetracarboxylic dianhydride, 3-methylcyclobenzene-1,2,4,5-tetracarboxylic dianhydride, 3-chlorobenzene-1,2,4,5-tetracarboxylic dianhydride, 3-ethylbenzene-1,2,4,5-tetracarboxylic dianhydride, 3-aminobenzene-1,2,4,5-tetracarboxylic dianhydride, 3-amino-6-methyl-benzene-1,2,4,5-tetracarboxylic dianhydride, 6-hydroxybenzene-1,2,4,5-tetracarboxylic dianhydride, 3-benzenecarboxylic acid-1,2,4,5-tetracarboxylic dianhydride, cyclohexane-1,2,4,5-tetracarboxylic acid dianhydride, 3,6-dimethylcyclohexane-1,2,4,5-tetracarboxylic acid dianhydride, 3-chlorocyclohexane-1,2,4,5-tetracarboxylic acid dianhydride, 3-ethylcyclohexane-1,2,4,5-tetracarboxylic acid dianhydride, 3-aminocyclohexane-1,2,4,5-tetracarboxylic acid dianhydride, 3-hydroxycyclohexane-1,2,4,5-tetracarboxylic acid dianhydride and 3-cyclohexane carboxylic acid-1,2,4,5-tetracarboxylic acid dianhydride.

Illustrative of suitable monoanhydrides for use in the preparation of the imide-imine curing agents are: cyclobutane dicarboxylic acid monoanhydride, benzene dicarboxylic acid monoanhydride, cyclopentane dicarboxylic acid monoanhydride, 3,6-dimethyl benzene-1,2-dicarboxylic acid monoanhydride, 3-chlorobenzene-1,2-dicarboxylic acid monoanhydride, 3-ethylbenzene-1,2-dicarboxylic acid monoanhydride, 3-aminobenzene-12,-dicarboxylic acid monoanhydride, 6-hydroxybenzene-1,2-dicarboxylic acid monoanhydride, 3,6-dimethylcyclohexane-1,2-dicarboxylic acid monoanhydride, 3-ethylcyclohexane-1,2-dicarboxylic acid monoanhydride, 3-aminocyclohexane-1,2-dicarboxylic acid monoanhydride, 3-cyclohexane carboxylic acid-1,2-dicarboxylic acid monoanhydride.

Examples of diamines that can be used in the preparation of the imide-amines of the invention are: 1,2-cyclobutane diamine, 2-chloro-1,3-cyclobutane diamine, 2-methyl-1,3-cyclobutane diamine, 2,4-dimethyl-1,3-cyclobutane diamine, 2-ethyl-1,3-cyclobutane diamine, 2-amino-1,3-cyclobutane diamine, 2-hydroxy-1,3-cyclobutane diamine, 2,4-dihydroxy-1,3-cyclobutane diamine, 2-carboxylic acid-1,3-cyclobutane diamine, 1,2-cyclobutane diamine, 2-chloro-1,2-cyclobutane diamine, 2-methyl-1,2-cyclobutane diamine, 2,4-dimethyl-1,2-cyclobutane diamine, 2-ethyl-1,2-cyclobutane diamine, 2-amino-1,2-cyclobutane diamine, 2-hydroxy-1,2-cyclobutane diamine, 2,4-dihydroxy-1,2-cyclobutane diamine, 2-carboxylic acid-1,2-cyclobutane diamine, p-phenylene diamine, 2-chloro-1,4-phenylene diamine, 2-methyl-1,4-phenylene diamine, 2,4-dimethyl-1,4-phenylene diamine, 2-ethyl-1,4-phenylene diamine, 2-amino-4-phenylene diamine, 2-hydroxy-1,4-phenylene diamine, 2,4-dihydroxy-1,4-phenylene diamine, 2-carboxylic acid-1,4-phenylene diamine, 1,5-phenylene diamine, 2-methyl-1,5-phenylene diamine, 2,3-dimethyl-1,5-phenylene diamine, 2,3,4-trimethyl-1,5-phenylene diamine, 2,3,4,6-tetramethyl-phenylene diamine, 2-ethyl-1,5-phenylene diamine, 2-amino-1,5-phenylene diamine, 2-hydroxy-1,5-phenylene diamine, 2,4-dihydroxy-1,5-phenylene diamine, 2-carboxylic acid-1,5-phenylene diamine, 1,2,5-phenylene triamine, 2-hydroxy-1,5-phenylene diamine, 2,3-dihydroxy-1,5-phenylene diamine, 2,3,4-trihydroxy-1,5-phenylene diamine, 1,4-cyclohexane diamine, 2-methyl-1,4-cyclohexane diamine, 2,3-dimethyl-1,4-cyclohexane diamine, 2,3,5-trimethyl-1,4-cyclohexane diamine, 2,3,5,6-tetramethyl-1,4-cyclohexane diamine, 2-ethyl-1,4-cyclohexane diamine, 2-hydroxy-1,4-cyclohexane diamine, 2,4-carboxylic acid-1,4-cyclohexane diamine, 1,2,5-cyclohexane triamine, 1,2,3,5-cyclohexane tetramine, 2-hydroxy-1,4-cyclohexane diamine, 2,3-dihydroxy-1,4-cyclohexane diamine, 2,3,4-trihydroxy-1,5-cyclohexane diamine, 2,3,4,6-tetrahydroxy-1,5-phenylene diamine, 1,2-cyclopentane diamine, 3-methyl-1,2-cyclopentane diamine, 3-hydroxy-1,2-cyclopentane diamine, 3-ethyl-1,2-cyclopentane diamine, 3-amino-1,2-cyclopentane diamine, 3-carboxylic acid-1,2-cyclopentane diamine, 3,4-dihydroxy-1,2-cyclopentane diamine, 1,4-pentane diamine, 3-methyl-1,4-cyclopentane diamine, 3-hydroxy-1,4-cyclopentane diamine, 3-ethyl-1,4-cyclopentane diamine, 3-amino-1,4-cyclopentane diamine, 3-carboxylic acid-1,4-cyclopentane diamine, 2,3-dimethyl-1,4-cyclopentane diamine, 2,3-dihydroxy-1,4-cyclopentane diamine, 3,4,5-trihydroxy-1,2-cyclopentane diamine, 2,3,5-trihydroxy-1,4-cyclopentane diamine, 3,4,5-trimethyl-1,2-cyclopentane diamine and 2,3,5-trimethyl-1,4-cyclopentane diamine.

The expressions epoxy resins and polyepoxides are used herein interchangeably to refer to the broad class of epoxy-containing reactants which react with the imide-amine curing agents to produce a hard infusible resin product. The polyepoxide can be a single compound containing at least two epoxy groups in which case it is a diepoxide. It can also contain a variety of molecular species having a varying number of epoxy groups per molecular such that the average number of epoxy groups per molecule, that is the epoxy equivalent value, is specified. The epoxy equivalent value of these polyepoxides comprising a mixture of molecular species is greater than one and is preferably about two or more, but will generally not be a whole integer. The epoxy equivalent value is obtained by dividing the average molecular weight of the polyepoxide by its epoxide equivalent weight (grams of the polyepoxide containing one gram equivalent of epoxide). The polyepoxide can be aliphatic, cycloaliphatic, aromatic, heterocyclic mixtures of these, saturated or unsaturated, and the like. It can be liquid or solid but must be soluble in the resin solution, or if not soluble capable of forming a homogeneous dispersion in the resin solution.

This broad class of epoxy resins which is useful in forming the epoxy-containing polymer with this resin-forming solution is exemplified by reference to several of the better known types. The glycidyl group of epoxy resins is an important and useful type of epoxy resin. This group includes the glycidyl ethers, the glycidyl esters, the glycidyl amines, and the like. The glycidyl ethers include the glycidyl ethers of mononuclear polyhydric phenols, polynuclear polyhydric phenols and the aliphatic polyols. They may be single compounds or more commonly are a mixture of compounds, some of which are polymeric in nature. Illustrative of glycidyl ethers are the di- or polyglycidyl ethers of ethylene glycol; trimethylene glycol; glycerol; diglycerol; erythritol; mannitol; sorbitol; polyallyl alcohol; butanediol; hydrogenated bisphenol A; and the like.

The glycidyl ethers of polyhydric phenols include the glycidyl ethers of resorcinol; hydroquinone; catechol; pyrogallol; and the like as well as the glycidyl ethers of polynuclear phenols such as bisphenol A; bis(4-hydroxyphenyl) methane, and the like, and glycidyl ethers of the novolac resins such as bisphenol F and the like. The epoxy resins also include epoxidized olefins generally based on naturally occuring oils, such as epoxidized soybean oil, epoxidized cotton seed oil, epoxidized castor oil, epoxidized linseed oil, epoxidized menhaden oil, epoxidized lard oil and the like, but also including epoxidized butadiene, epoxidized polybutandiene, and the like.

Preferred epoxy resins for use in the invention are polyglycidyl derivatives of aminophenols having the formula:

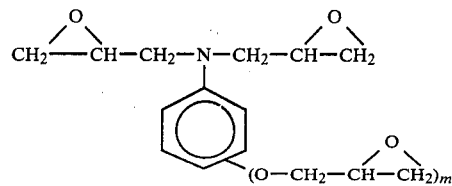

wherein m is 1 to 2. The preferred polyglycidyl derivative of aminophenol at the present time is triglycidyl p-aminophenol (m is 1). The polyglycidyl derivatives of aminophenols are normally fluid, viscous materials which are commercially available. Such polyglycidyl aminophenols can be prepared according to the disclosures of Reinking et al U.S. Pat. No. 2,951,825.

If desired, other co-curing agents can be joined together with the imide-amine component of the invention. Such co-curing agents, include for instance, anhydrides such as maleic anhydride, succinic anhydride, phthalic anhydride, tetrahydrophthalic anhydride, NADIC methyl anhydride, pyromellitic anhydride, and the like.

In forming the compositions of the present invention, the imide-amide and epoxy resin components will be used in amounts sufficient to provide an effective weight ration I/E of imide-amine:epoxy resin in the range of about 0.2–1.3:1, preferably about 0.55–1.1:1, and preferentially about 0.55–1.1:1, and preferentially about 0.6–0.9–5:1. When mixed curing systems are employed, that is curing systems including in addition to the imide-amine another anhydride curing agent, it is preferred that at least about 40 percent of the total anhydride plus imide equivalents be provided by the imide-amine component of the mixed curing systems. In like manner, when mixed epoxy resin systems are employed, it is preferred that at least 50 percent of the total epoxy equivalents be a polyglycidyl aminophenol component of such mixed epoxy resin compositions. Since solubilization of the imide-amine in the epoxide component is a function of a number of variables, including particle size, amount of total imide-amine and/or total epoxy resin, relative amounts of individual imide-amine and/or individual epoxy resin, inter alia, some amount of routine experimentation may be required to obtain optimal compositions.

Because the epoxy resin systems of this invention are reactive at room temperature, mixing of the imide-amine and the epoxy components will preferentially be accomplished at the job site. The reactive system is readily prepared by blending the curing agent system comprising imide-amine preferably having a particle size below about 150 microns average diameter, into the epoxy resin system. In this regard, when other anhydrides are employed as co-curing agents, the individual curing agents are preferably admixed prior to incorporation into the epoxy resin system, which itself can be a priorly admixed system comprising two or more epoxy resins. When employing mixed epoxy resin systems, the imide-amine component can optionally, but less preferentially be mixed into one epoxy resin prior to being blended into the other epoxy resin or resins employed. Simple mixing means such as by stirring, ball milling and the like, is effective to cause substantial solubilization of the imide-amine in the epoxy resin component. Prior to admixing of the imide-amine and epoxy components, it can be advantageous to subject at least the imide-amine to high shear forces, such as a three-roll mill, to reduce the average particle size, to enhance solubilization of imide-amine particles. While mixing is preferably accomplished at room temperature, gentle heating of the imide-amine/epoxy blend to temperatures below about 50° C. can be employed to abet solubilization, particularly at higher anhydride:epoxy ratios and when using mixed curing agents and/or mixed epoxy resin systems, without causing significant premature gellation of the blend. The blending of the imide-amine and epoxy resin results in a mild, rapid endotherm on the order of 7° C.-12° C., followed by a gradual return to ambient temperature.

As aforementioned, because the epoxy resin compositions of the present invention are curable at room temperature, the compositions of this invention are preferably provided as a two-part system, one part comprising the imide-amine and other curing agents when employed, together with conventional additives which are not reactive with the curing agents; and the other part comprising epoxide, together with conventional additives which are not reactive with epoxy resins. The individual parts are admixed at the job site and application is accomplished using the same techniques and equipment generally utilized with epoxy resin compositions. Even though curable at room temperatures, the compositions of this invention nevertheless remain workable for periods in excess of 8 hours before crosslinking has advanced to a degree sufficient to inhibit continued use of the blended compositions. Curing of the compositions can be effected at room temperature but curing at elevated temperatures below about 150° C. can be beneficial with respect to ultimate properties and setting times, depending upon the application. Curing at temperatures above 150° C. does not appear to provide any appreciable improvement in cured resin properties.

The following examples will serve to illustrate the invention. Unless otherwise noted, amounts are in parts by weight.

EXAMPLE I

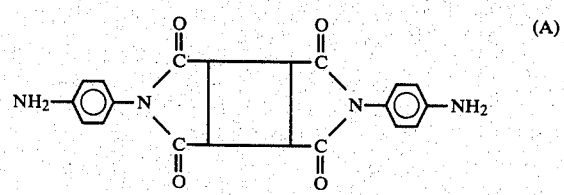
(A)

Cyclobutane tetracarboxylicdianhydride (CBTCDA) is reacted with para-phenylenediamine (PPDA) in a mole ratio of 1:2 according to the following procedure:

A solution of CBTCDA in dimethylformamide (DMF) is introduced dropwise into a solution of PPFA in dimethylformamide (DMF) at room temperature after four hours, a dark brown solid amide-acid precipitate is formed having the structure:

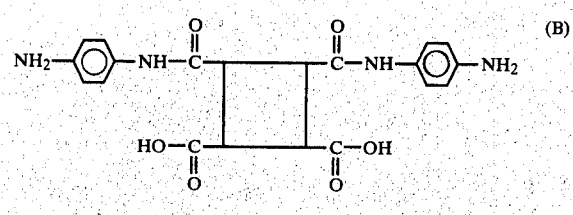
(B)

A mixture containing pyridine and acetic anhydride in a weight ratio of 3:2 is added to the amide-acid reaction product (B) and the temperature is raised to 80° C. The amide acid (B) is thus condensed to the imide-amine (A). The imide-amine (A) obtained is in solution and is separated by distilling off the solvents and drying in an air-circulated oven.

Alternately, the amide acid may be condensed to imide anhydride by temperature alone by heating above 180° C.

EXAMPLE II

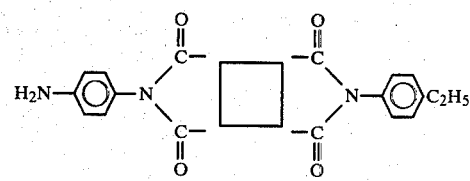

p-Ethylaniline (pEA) is reacted with cyclobutanetetracarboxylic acid dianhydride (CBTDA) in a molar ratio of 1:2 to form the imide anhydride intermediate which is reacted with p-phenylene diamine in a 1:1 molar ratio according to the following procedure:

Solid cyclobutanetetracarboxylic acid, 0.2 mols, is added to a stirred reactor containing 0.1 mols p-ethylaniline in dimethylformamide at 0° C. and stirred under a nitrogen blanket until all primary amine has disappeared. The precipitated anhydric-amic acid is separated from the solution and washed once with dimethylformamide. The solid amic acid is suspended in dimethylformamide and 100 ml of a solution containing pyridine and acetic anhydride in a weight ratio of 3:2 is added to the suspension. The mixture is heated to 80° C. and stirred for 2 hours. A solution containing 0.1 mols p-phenylenediamine is added to the reaction mixture and stirring is continued at 80° C. for an additional two hours. The diimide-amine is recovered from solution by distilling off the solvent in a stream of nitrogen.

EXAMPLE III

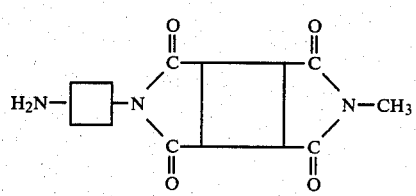

The imide-amine of the Example is obtained by the following procedure:

To a dimethylformamide solution containing 0.1 mols methylamine, 0.2 mols cyclobutanetetracarboxylic acid is added. The reaction vessel is maintained at 0° C. As soon as the cyclobutanetetracarboxylic acid is dissolved, the reaction vessel is brought to a temperature of 50° C. The solution is stirred at 50° C. until there is no free amine in the solution. The temperature is then raised until the dimethylformamide refluxes gently (153° C.). After refluxing for one hour, the solution is cooled to room temperature and 0.1 mol cyclobutane-1,3-diamine is added to the solution. The reaction vessel is heated to 80° C. and 100 ml of solution containing pyridine and acetic anhydride in a weight ratio of 3:2 is added and stirring is continued at 80° C. for an additional two hours. The diimide-amine is recovered from solution by distilling off solvent in a stream of nitrogen.

EXAMPLE IV 11.1 grams of triglycidyl para-amino phenol (TGPAP) and 2.97 grams of the imide-amine of Example I are hand-mixed, poured into a bar-mold and cured at 120° C. for 3 hours and post cured at 204° C. for another 3 hours.

The imide-amine curing agent successfully cured the epoxy resin system in the same manner as commercial anhydride curing agent and examination of the cured epoxy-imide systems under a polarizing like microscope will show a homogeneous one phase structure indicating complete solubility of the imide anhydride in the epoxy resin.

Differential Scanning Colorimetry and Thermogravimetric Analysis show that the thermal softening point of the resulting cured epoxy/imide system is in excess of 300° C.

The imide-amine/epoxy resin compositions of this invention can be used in adhesive, casting, molding, potting and encapsulation, coating, laminating, reinforced plastic, and the like applications to afford ultimate products having useful high temperature properties. The base epoxy resin compositions can also be used to modify, or can be modified by other epoxy resin systems; and other liquid and/or solid anhydrides can be employed as cocuring agents. The base epoxy resin compositions can be modified also by the incorporation of other resinous film forming material, such as polybutadiene, hydroxy- and-carboxy-functional polybutadiene polyamides, and the like to improve flexibility, impact resistance, etc. There may be incorporated into the compositions of the invention, whether or not modified, those additives conventionally employed with epoxy resin compositions including, without limitation thereto, solvents, fillers, particularly metal and conductive metallic fillers, plasticizers, flexibilizers, reinforcing fibers, carboxylic acids, inorganic acids, free radical sources, coupling agents such as polyfunctional organosilanes and the like, antioxidants, catalysts, and the like.

The other epoxy resins which can be combined with the base epoxy resin compositions of the invention can be broadly described as organic materials having a plurality of reactive 1,2-epoxy groups. Such epoxy materials can be monomeric or polymeric, saturated or unsaturated, aliphatic, cycloaliphatic, aromatic or heterocyclic, and they may be substituted if desired with substituents other than epoxy groups, such as hydroxyl groups, either radicals, halogen atoms, and the like. Representative epoxy materials include, without limitation thereto, epoxy polyethers obtained by reacting an epihalohydrin with a polyhydric phenol or a polyhydric alcohol; polyepoxy-polyhydroxypolyethers obtained by reacting a polyepoxide with a polyhydric phenol or a polyhydric alcohol; epoxy novolaks; and the like. Further details of epoxy co-reactants which can be employed according to the present invention can be found in U.S. Pat. Nos. 2,633,548; 2,872,427; 2,884,408; and 3,759,914, among others.

What is claimed is:

1. A room temperature-stable two-pack epoxy resin system consisting essentially of
   (a) a first pack comprising at least one imide-imine having the structure

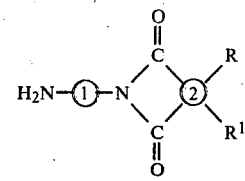

wherein —①—
is a divalent cycloaliphatic or aromatic radical selected from the group consisting of

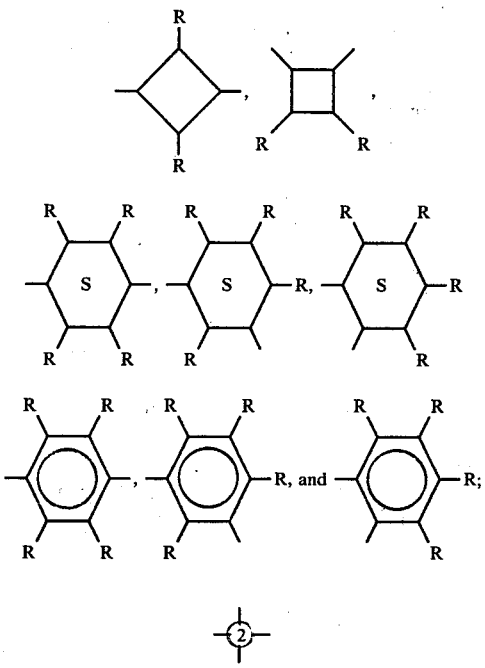

$-②-$ is a tetravalent cycloaliphatic or aromatic radical selected from the group consisting of

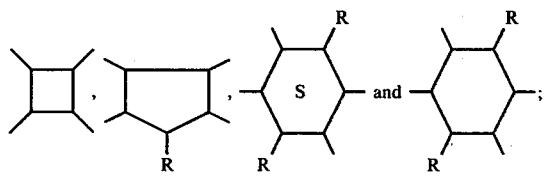

R and $R^1$ can be the same or different and each is selected from the group consisting of hydrogen, halogen, alkyl group having from 1 to 4 carbon atoms, hydroxyl, carboxyl and amine and when taken together, R and $R^1$ are:

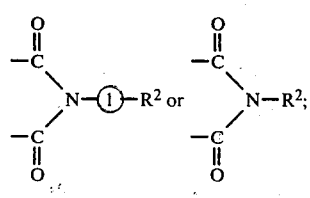

wherein $R^2$ is the same as R and $R^1$; with the proviso that, in all cases,

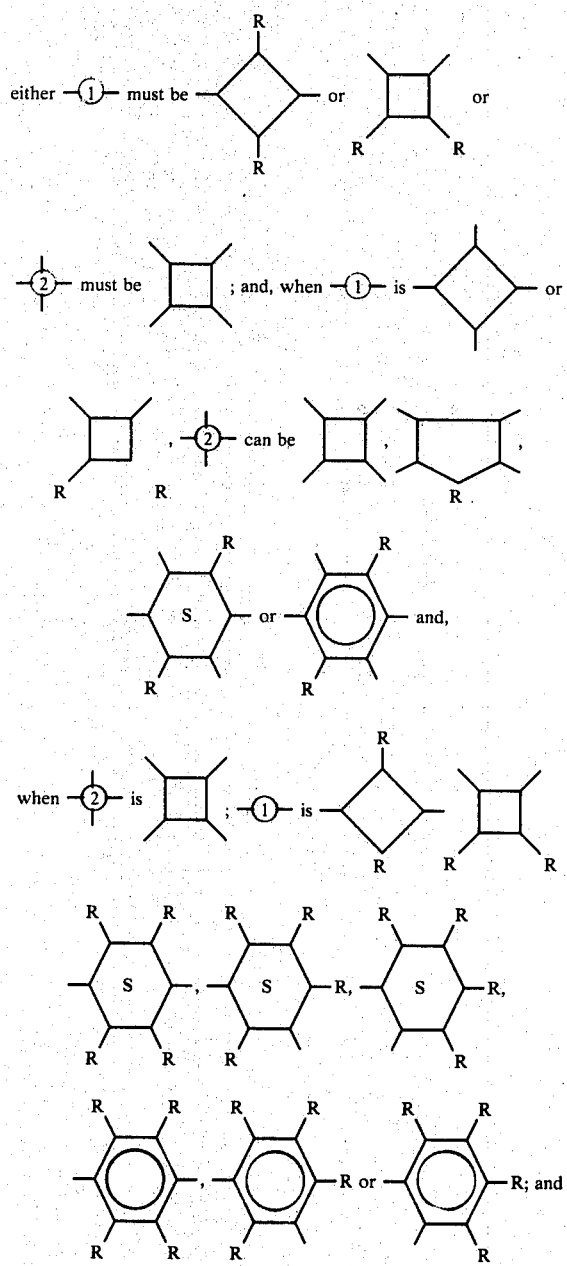

(b) a second pack comprising an epoxy resin substantially free of active hydrogen having a 1,2 epoxy equivalent value of greater than 1 and capable of solubilizing said imide-amine.

2. An epoxy resin system according to claim 1 wherein

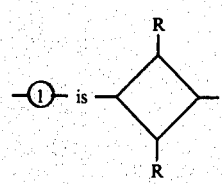

3. An epoxy resin system according to claim 2 wherein

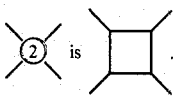

4. An epoxy resin system according to claim 1 wherein

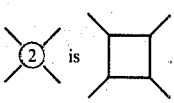

5. An epoxy resin system according to claim 4 wherein

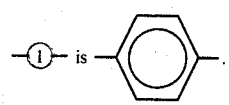

6. An epoxy resin system according to claim 1 wherein R and R taken together is

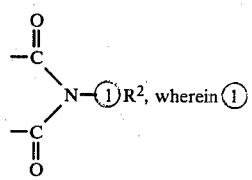

is as previously defined and $R^2$ is the same as R and $R^1$.

7. An epoxy resin system according to claim 1 wherein R and $R^1$ taken together is

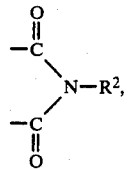

wherein $R^2$ is the same as R and $R^1$.

8. An epoxy resin system according to claim 1 wherein the epoxy resin comprises at least one polyglycidyl amino-phenol having the structure

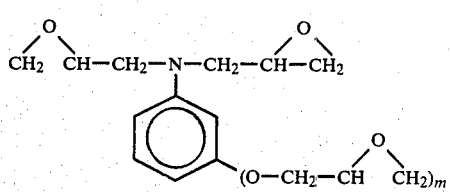

wherein m is 1 or 2.

9. An epoxy resin system according to claim 8 wherein

10. An epoxy resin system according to claim 9 wherein
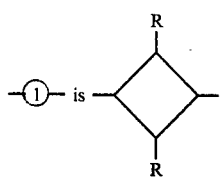
11. An epoxy resin system according to claim 8 wherein
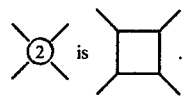
12. An epoxy resin system according to claim 11 wherein
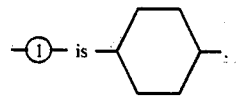
13. An epoxy resin system according to claim 8 wherein the imide-amine has the structure
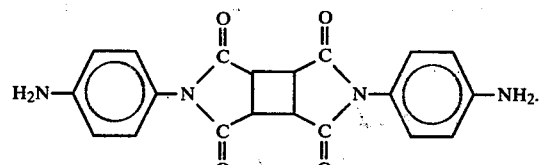
* * * * *